Aug. 23, 1927.
P. J. O. MILLER
STEAM GENERATOR
Filed Dec. 9, 1925
1,639,953
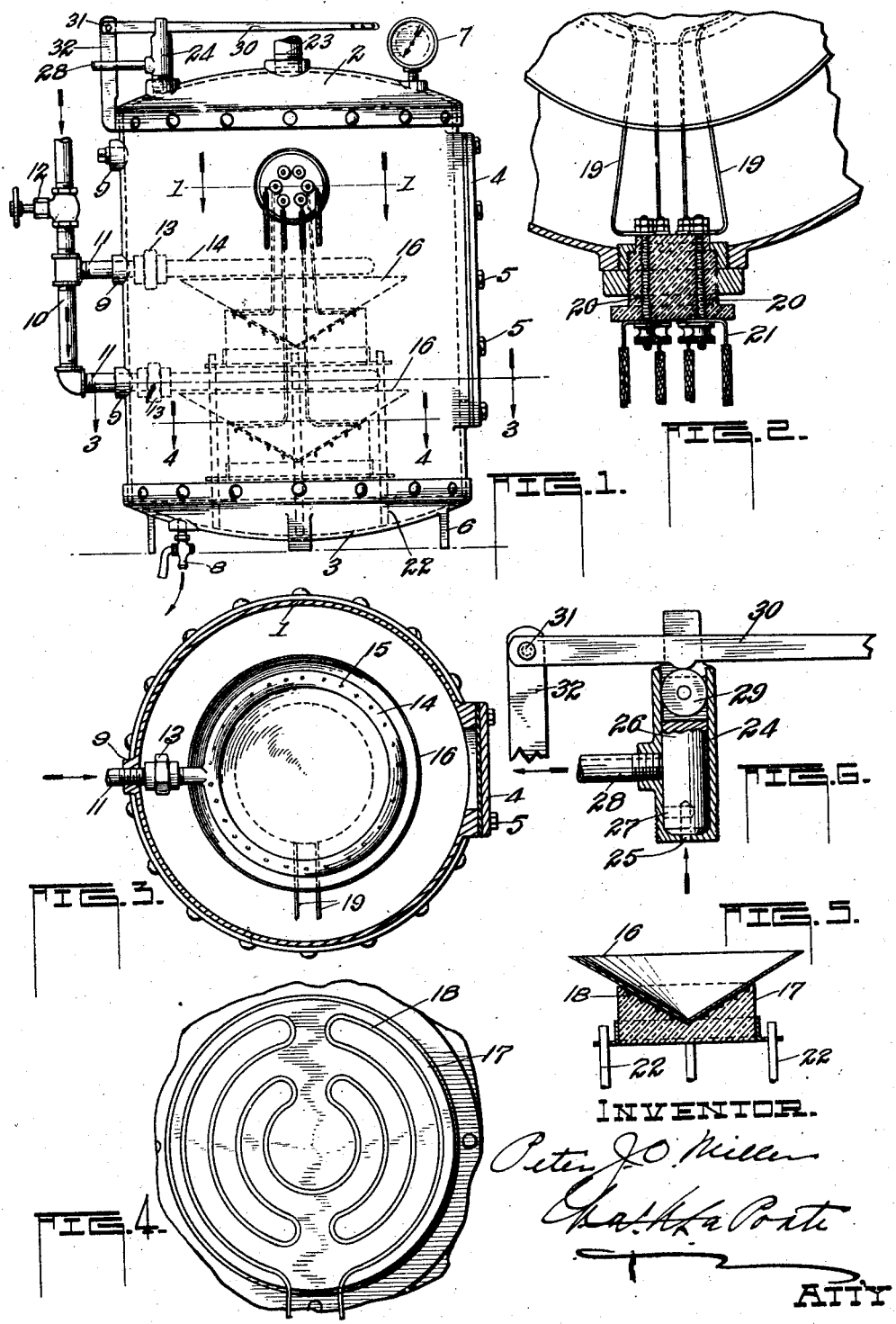

Patented Aug. 23, 1927.

1,639,953

UNITED STATES PATENT OFFICE.

PETER J. O. MILLER, OF PEORIA, ILLINOIS.

STEAM GENERATOR.

Application filed December 9, 1925. Serial No. 74,250.

This invention has reference to steam generators and it has for its principal object to provide for the generation of steam by means of preferably an electrical heating element or elements.

The invention has for a further object to provide such a generator which shall be useful as a motive medium for the operation of engines and like power units and which is especially adaptable for automotive uses, however, its use may be extended for other and various purposes.

The invention comprehends a generator embodying one or more drip pans or receptacles into which water is showered from a source of supply and in the employment of heating elements preferably electrical coils associated with said pans or receptacles for heating the same and thereby generating steam, and an egress means for conveying or carrying off the steam to the motive unit.

That the invention may be more fully understood, reference is had to the accompanying drawings forming a part of the present description illustrating a preferred embodiment of the invention, in which:—

Figure 1 is a side elevation of a steam generator, showing a preferred arrangement of certain of the parts, and showing in dotted lines the water pipes and heating elements therewithin;

Figure 2 is a sectional view taken on the line 1—1, Figure 1, showing the binding post connections for the conduits which conduct electricity to the elements within the steam generator;

Figure 3 is a plan in section as the same would appear if taken on the line 3—3, Figure 1, showing a water pipe, drip pan and electrical conductors within the generator;

Figure 4 is a view showing a preferred arrangement of the heating elements or electrical conductors showing the drip pan or receptacle removed, as the same would appear if taken on the line 4—4, Figure 1;

Figure 5 is a vertical section view showing the relative positions of the drip pan and heating elements, and Figure 6 is a view of a safety or blow-off valve, shown partially in cross section.

Like characters of reference denote corresponding parts throughout the figures.

Referring to the drawings, Figure 1 discloses a boiler 1 having riveted on its ends closures 2 and 3, respectively, the same being heavily constructed for the purpose of resisting a high pressure built up therewithin. A hand hole cover plate 4 is provided for the purpose of making entry within the boiler or generator 1 for making repairs or other necessary adjustments needed, the same being retained in place by a plurality of bolts 5. The lower closure 3 is shown provided with legs or standards 6, however, it is to be understood that other supporting means may be used.

A steam pressure gauge 7 is provided on the closure 2 for purposes well known in the art and a drain cock 8 is provided on the closure 3 for the purpose of draining the bottom of the boiler 1 of water and other foreign matter.

Provided on the body portion of the boiler 1 are shown a plurality of openings or ports 9, two of which have connection to a water supply pipe 10 by means of nipples 11, said water pipe having a globe valve 12, included therein for the purpose of controlling the supply of water within the boiler 1, the object of which is to be further described.

Referring to Figure 3, it will be seen that a union 13 has connection within the boiler 1 to the nipple 11 and connected with and extending horizontally from said union 13 is a circular water pipe 14 and having on the underneath side thereof a plurality of water escape holes or perforations 15, as shown.

A drip pan or receptacle 16 best seen in Figure 5, is supported immediately below the water pipe 14, its relationship to the pipe 14 being approximately as shown in Figure 1, said pan being preferably of copper material due to its quick heat conducting properties. Said pans 16 are supported by rests of preferably nonconductive material 17 which are shaped to receive conically shaped drip pans or receptacles 16.

The heating elements for the respective pans or receptacles 16 are designated 18 and comprise suitably constructed electrical coils which are preferably located between the rests 17 and the pans or receptacles 16 in the manner preferably shown in Figure 5. Said coils are connected with conductor terminals 19 secured to binding posts 20 suitably secured through the wall of the main body of the generator, to which are connected suitable conductor terminals 21. The character and construction of the heating elements and the manner and form of conveying electrical energy thereto may be of any preferred construction best adapted for the uses herein intended, and may be provided with connections of suitable character leading to any of the well known sources of supply.

I preferably support or suspend the drip pans or receptacles and their rests in suitably spaced superimposed relation by means of standards 22 shown in dotted lines in Figure 1 which are connected with an end closure of the generator body. While I have shown a preferred support, it is obvious that any other convenient and suitable support may be provided. Furthermore, while I have elected to show two drip pans and associated heating elements, together with a water supply for each, from a common inlet, it is obvious that one or a plurality of more than two may be provided.

A steam conducting pipe 23 is shown leading from the generator or boiler 1 and preferably connected through the end closure 2. This end closure is also provided with a safety or blow-off valve which in its preferred construction includes a casing 24 having an inlet opening 25 and within said casing is arranged a slidable piston or plunger 26 having formed at its lower end the annularly arranged conduit 27 which is adapted under pressure to be brought into coincidence with an outlet pipe 28 which may have connection with any suitable condenser, not shown. The cylinder 26 is provided with an anti-friction roller 29 upon which is adapted to ride a lever arm 30 to the free end of which, if desired, may be connected any suitable pressure regulating means, not shown, and said lever arm 30 has a pivotal connection at 31 with a suitable bracket 32 supported from the generator or boiler 1.

In the operation of the generator, it will be understood, that with the pipe 10 connected to a suitable source of supply and opening the globe valve 12 that water will enter the boiler through the nipples 11 and into the pipe 14 and be showered upon the drip pans 16 by reason of the water holes or perforations 15 on the underneath side of said pipe and by reason of the heating elements 18 being electrically energized, it will be readily understood that the water in the drip pans 16 will be immediately generated into steam, such steam rising within the boiler to be carried off by means of the steam conducting pipe 23, as shown in Figure 1. It will be readily understood that the generation of steam is controlled through the regulating valve 12, in other words, if the consumption of steam is great, a larger supply of water will be needed and if the consumption of steam be small, the necessity for a supply of water will be naturally reduced. Should the pressure of steam within the boiler exceed the pressure limit, it will be further understood that the lever arm 30 will be moved by means of the piston 27 of the safety or blow-off valve and thereby release steam through the communicating openings 25 and 27 and be released through the pipe 28 to any suitable condenser, not shown.

What I claim is:

In a generator of the character described, in combination, a casing, a plurality of drip pans arranged in superimposed relation within said casing, an electrical heating coil beneath each pan, means for electrically energizing said coils, nonconductive rests for the respective coils and pans, supporting means for said rests and pans, a water conducting pipe connected with the casing and a perforated pipe in the form of a ring above each pan and connected with said pipe.

In witness whereof, I have hereunto affixed my hand this 5th day of December, 1925.

PETER J. O. MILLER.